United States Patent Office 3,812,016
Patented May 21, 1974

3,812,016
CULTURE-GROWING APPARATUS
Hans Muller, Im Allmendli, Erlenbach,
Zurich 139, Switzerland
Filed July 21, 1972, Ser. No. 274,063
Claims priority, application Switzerland, Aug. 13, 1971, 11,986/71; Apr. 6, 1972, 5,095/72; Apr. 28, 1972, 6,457/72
Int. Cl. C12b 1/10
U.S. Cl. 195—139
11 Claims

ABSTRACT OF THE DISCLOSURE

A vessel has a chamber in which media requisite for growing of a desired culture are to be accommodated. A horizontal shaft extends through this chamber and is rotatable about its own longitudinal axis. A spiral carrier element is mounted on the shaft for rotation therewith, being composed of a plurality of convolutions and consisting of glass, of metal coated with vitreous enamel or of synthetic plastic.

BACKGROUND OF THE INVENTION

The present invention relates generally to a culture-growing apparatus, and more particularly to an apparatus for growing cultures of tissue cells and microorganisms.

The requirement for the growing of cultures of tissue cells and microorganisms is not new in itself. Particularly in the culturing of tissue cells, especially those which are required for producing vaccines, it is necessary to produce diploid cells which are isolated from a tissue; experience has shown that such diploid cells must be allowed to grow only on a rigid carrier in a one-celled layer, a so-called "monolayer."

These requirements can be met for laboratory-scale culturation in glass containers, particularly in the so-called Roux' flask, where the carrier is the flat bottom of the flask. If the growth is required to be carried out on a larger scale, however, for instance for the purpose of producing vaccines, then evidently the surfaces of the carrier on which the cultures are made to grow, must be as large as possible in order to obtain maximum yield. In addition, the growth conditions must be uniform everywhere on the carrier, and the same is true of the aeration, the composition of the nutrient substrate, the temperature and other parameters. For example, when it is desired to produce anti-virus vaccines, a monolayer cell culture is first grown, and is then inoculated with a liquid containing the virus. The virus then infects the cells of the culture whereupon the cell walls are digested by the addition of trypsin and the virus-infected cell content is harvested. In a similar manner, yeasts, various bacteria, algae, fungi (for instance for producing antibiotic and enzymes) and the like can also be produced on such planar carrier surfaces.

For applications requiring the production of larger quantities of biologically effective substances, the prior art has first proposed horizontal plates, and subsequently vertical disks which are made to rotate slowly about a horizontal axis and to dip over part of their periphery into the nutrient medium. Another proposal utilizes cylindrical glasses which are inserted into a large wheel which rotates slowly. More recent proposals utilize horizontal tubes mounted between vertical disks which are rotated about a horizontal axis.

All of these prior-art proposals have various disadvantages known to those conversant with this field. The last-mentioned proposals, for instance, make it necessary to connect the individual tubes with one another, an arrangement which is both complicated and makes it difficult to clean the construction and sterilize it. When the various constructions are of the type utilizing more or less vertical plates or disks which rotate about a horizontal axis, the proper adhesion of the culture layer is not assured.

SUMMARY OF THE INVENTION

It is, accordingly, a general object of the present invention to overcome the disadvantages of the prior art.

More particularly, it is an object of the invention to provide a culture-growing apparatus which permits in a simple manner the growth of culture on large surface areas.

An additional object of the invention is to provide such a culture-growing apparatus which permits the ready harvesting of the culture without having to open the apparatus. This assures, inter alia, that the entire operation can be carried out under conditions of maximum sterility, that is conditions which are essential in the growth of such cultures.

In pursuance of these objects, and of others which will become apparent hereafter, one feature of the invention resides, in a culture-growing apparatus, in a combination comprising wall means forming a chamber adapted to accommodate media requisite for growing of a desired culture, and a substantially horizontal shaft extending in this chamber and being mounted for rotation about its own longitudinal axis. A spiral carrier element is mounted on the shaft for rotation therewith, with the element surrounding the shaft and comprising a plurality of convolutions.

The axially elongated spiral carrier element provides for a large surface area on which the culture can grow. Because the chamber in which the carrier element rotates is only partially filled, a slow rotation of the carrier element assures that the space between two adjacent (but not contacting) convolutions will always alternately be filled with substrate liquid and with gas (mostly sterile air). This assures that the culture growth will contact both media regularly and evenly. During the inoculation and growth period the number of revolutions at which the carrier element is rotated, is maintained very small in order to permit the cells the opportunity to adhere to the surface of the carrier element and to grow thereon. When the growth is completed the substrate may be withdrawn from the chamber, the virus-carrying inoculation material may be added to the chamber, and thus the virus may be grown directly on the layer of culture which grows on the spiral carrier element. When subsequently the cell-contents are to be harvested the spiral carrier element is rotated at a sufficiently high speed to cause friction of the cell culture against the liquid content of the chamber to dislodge the cell culture which can thereupon be withdrawn from the chamber. If the cell culture is of the type which tends to adhere very strongly, then a grainy substance (for instance quartz sand, synthetic plastic granulate or the like) may be admitted into the chamber and the substrate before harvesting is effected. The increased friction obtained in this manner assures that even strongly adhesive cell cultures will be removed during higher-speed rotation of the carrier element during or after their inoculation with virus. The addition of such granulates also assures a good cleaning of the apparatus so that it is not necessary to take the same apart for cleaning purposes before the next charge can be admitted.

Of course, the entire operation must be carried out under sterile conditions, a requirement which is self-evident and which can be admirably met with the apparatus according to the present invention.

If it is necessary, for instance for facilitating the removal of the cells for harvesting purposes and/or the removal of the granulate, the direction of rotation of the spiral carrier element can advantageously be changed.

The novel features which are considered as characteristic for the invention are set forth in particular in the appended claims. The invention itself, however, both as to its construction and its method of operation, together with additional objects and advantages thereof, will be best understood for the following description of specific embodiments when read in connection with the accompanying drawings.

DESCRIPTION OF THE PREFERRED EMBODIMENTS

Figure 1:
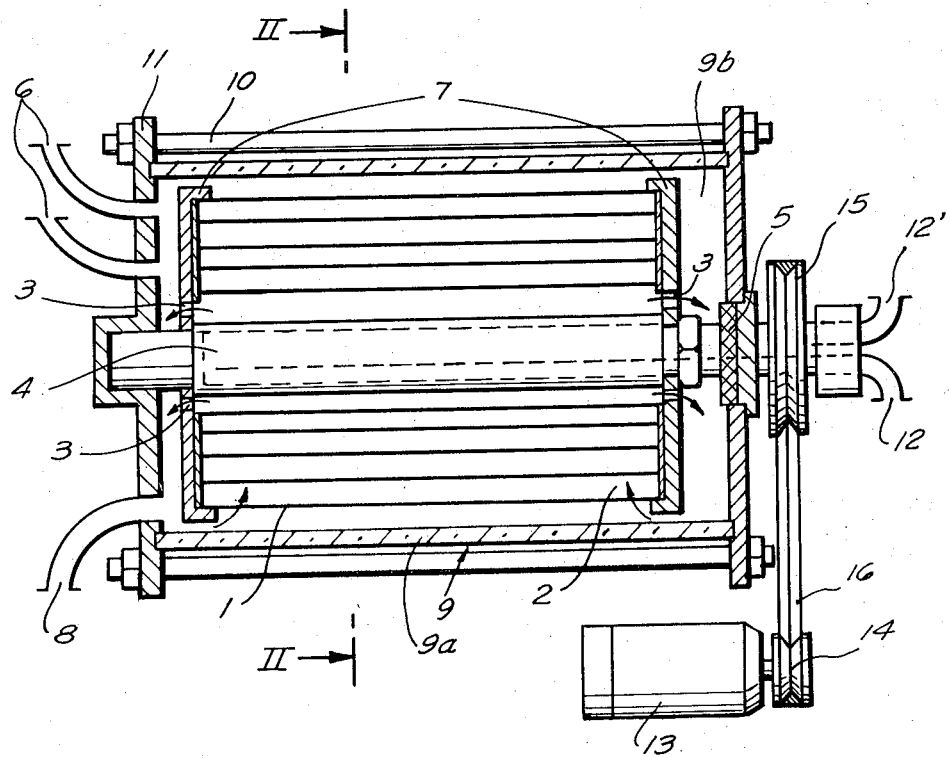
FIG. 1 is a somewhat diagrammatic longitudinal section through one embodiment of the novel apparatus.

Discussing the drawing now in detail, it will be seen that reference numeral 9 designates in toto a vessel having, in the illustrated embodiment, a circumferential wall 9a and two end walls 11. These walls together form a chamber 9b. The walls 11 are maintained on the wall 9a by means of the connecting rods 10 which extend from one to the other of the walls 11 as illustrated. The walls 11 may be of various materials, for instance metallic material, whereas the wall 9a is of a material permitting the visual inspection of the interior of the chamber 9b, for instance of glass as illustrated.

Extending through the chamber 9b and having a substantially horizontal orientation is a shaft 4, here illustrated as being hollow. The shaft 4 is suitably journalled for rotation and has a portion which extends outwardly through one of the walls 11 (the righthand one in 1). To maintain the interior of the chamber 9b sterile and to prevent leakage a stuffing box 5 or the like is provided, which seals the shaft 4 with respect to the wall 11 where the shaft passes through an opening provided in the wall 11 for the purpose. This type of seal is not novel and it therefore requires no detailed discussion.

The portion of the shaft 4 which is located exteriorily of the vessel 9 is provided with a pulley 15, and a reversible motor 13 is also provided with the pulley 14, for instance on its output shaft. A belt 16 connects the pulleys 14 and 15 so that the latter has rotational motion transmitted to it when the motor 13 is energized. Reversible motors are known per se, as are motors whose speed can be varied, a feature which is required in accordance with the present invention in order to assure that the shaft 4 can be rotated slower or faster, as necessary during different stages of the operation. Of course, speed variation can be achieved in other ways known to those skilled in the art, including by the use of variable sheaves.

A spiral carrier element 1 is mounted on the shaft 4 for rotation therewith, and this element 1 is composed of a plurality of convolutions (see especially FIG. 2) which are not in engagement with one another, so that a spiral path 2 exists between them. The path 2 has an outer inlet end at the periphery of the element 1 and an inner outlet end at or adjacent the center or core of the element 1. The opposite axial ends of the element 1, and thereby of this aforementioned path which is designated with reference numeral 2, are closed by end plates or end walls 7 which are connected with the carrier element 1 in suitable manner. An absolutely fluid-tight connection of the plates 7 with the carrier element 1 is not required, but in this connection it should be pointed out that such a fluid-tight connection (utilizing seals known per se) is required between the walls 9a and the walls 11 of the vessel 9.

Figure 2:
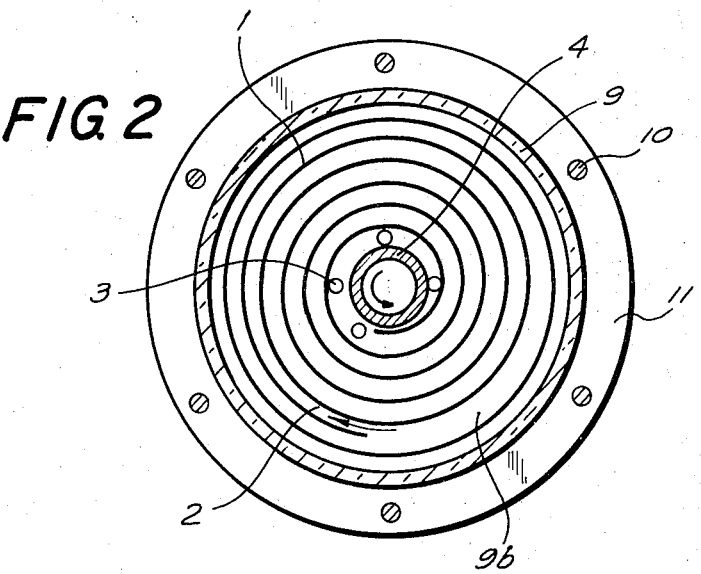
FIG. 2 is a somewhat diagrammatic section taken on line II—II of FIG. 1.

When the shaft 4 with the carrier element 1 is slowly rotated in the direction indicated by the curved arrow in FIG. 2, the liquid in the chamber 9b can enter the outer end of the path 2 in the direction of the arrow and will slowly flow through the entire spiral path until it reaches the center or core of the spiral carrier element 1, from where it leaves through the apertures 3 provided for this purposes in the end plates 7 to flow back into the chamber 9b. Thus, during each revolution of the spiral carrier element 1 liquid and gas will alternately pass along the path 2, in contact with the surface of the carrier element 1. The culture which develops and grows on the surfaces bounding this path 2 will thus alternately come in contact with both these media, that is the gas and the liquid.

Reference numerals 12 and 12' designate inlet and outlet connections by means of which the interior of the hollow shaft 4 can be connected with a source of heat-exchange fluid, that is heating and/or cooling fluid in form of a gas or liquid. Such fluid can then be circulated through the shaft 4 to provide heating or cooling as required.

Liquid and gaseous media can be admitted into the chamber 9b via the inlets 6, and contents can then be removed from the chamber 9b via the outlet 8. Of course, suitable closures will be provided for the inlets 6 and the outlet 8, but are not believed to require a detailed discussion because they are known per se.

Sterilization of the apparatus can be effected in an autoclave or by passing hot steam through the chamber 9b.

Although it is possible to rotate the entire vessel 9, it will be appreciated that the connections for admission of a liquid and gas (the inlets 6) must then be specially constructed to be and remain tight despite such rotation. Evidently, this more difficult and complicated construction also has disadvantageous consequences for the desired ease of producing and maintaining sterility in the chamber 9b. Thus, the illustrated exemplary embodiment is currently preferred.

Experience has shown that the growth of culture in monolayers is possible only on carriers whose characteristics are such as to permit adequate adhesion of the cells of the culture. The material which is conventionally used for such purposes is glass. However, it is difficult if at all possible to produce the spiral carrier element 1 according to the present invention from a plate or strip of glass. Therefore, the invention proposes to produce the carrier element 1 by utilizing a plurality of axially arrayed identically configurated spirals made of glass tubes or glass rods. These spirals are in axial abutment with one another and at the point of abutment they are connected by letting their materials melt and flow together.

The carrier element 1 can, however, also be produced from metallic material, advantageously steel, in which case strip or sheet steel can be utilized. In such a case, however, the exposed surfaces of the carrier 1 should then be provided with a coating of vitreous enamel. Still another possibility for producing the spiral carrier element 1 is to utilize synthetic plastic material, of which different ones can be used, with polycarbonate having been found to be particularly advantageous because it is sufficiently temperature-resistant and offers the necessary adhesion for the cells.

It will be understood that each of the elements described above, or two or more together, may also find a useful application in other types of constructions differing from the types described above.

While the invention has been illustrated and described as embodied in a culture-growing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is clamied as new and desired to be protected by Letters Patent is set forth in the appended claims.

What is claimed is:

1. In a culture-growing apparatus, a combination comprising wall means forming a chamber adapted to accommodate media requisite for growing of a desired culture; a substantially horizontal shaft extending in said chamber and being mounted for rotation about its own longitudinal axis; a spiral carrier element mounted on said shaft and comprising a plurality of convolutions, said spiral carrier element surrounding a spiral flow path for said media, said path extending from the outer periphery of said carrier element to the center of the latter; terminal walls provided at opposite axial ends of said carrier element to the center of the latter; terminal walls provided at opposite axial ends of said carrier element and together with the latter enclosing said path; and aperture means provided in at least one of said terminal walls and communicating with said chamber and with said path.

2. A combination as defined in claim 1 wherein said aperture means communicates with said path in the region of an innermost one of said convolutions.

3. A combination as defined in claim 1, wherein said shaft is hollow; and further comprising connecting means for connecting the interior of said hollow shaft with a source of heat-exchange fluid.

4. A combination as defined in claim 1, wherein said shaft extends through said wall means to the exterior of said chamber; further comprising sealing means sealing said shaft with reference to said wall means; and rotating means connected with said shaft exteriorly of said chamber for effecting said rotation of said shaft about said longitudinal axis thereof.

5. A combination as defined in claim 1; and further comprising rotating means connected with said shaft and operative for rotating the same at adjustable speeds and in different desired directions.

6. A combination as defined in claim 1, wherein said spiral carrier element is of synthetic plastic material.

7. A combination as defined in claim 6, wherein said synthetic plastic material is polycarbonate.

8. A combination as defined in claim 1, wherein said spiral carrier element is of glass.

9. A combination as defined in claim 1, wherein said spiral carrier element has an exposed surface, and wherein at least the portion of said carrier element having said exposed surface is of silicate glass.

10. A combination as defined in claim 1, wherein said spiral carrier element is of metal and has an exposed surface; and further comprising a layer of vitreous enamel provided on said exposed surface.

11. A combination as defined in claim 1, wherein said spiral carrier element is composed of a plurality of axially adjacent and abutting glass spirals, adjacent ones of which are fast with one another.

References Cited

UNITED STATES PATENTS

| | | | |
|---|---|---|---|
| 2,952,588 | 9/1960 | Rinderer | 195—143 |
| 3,732,149 | 5/1973 | Santero | 195—143 |

A. LOUIS MONACELL, Primary Examiner

R. J. WARDEN, Assistant Examiner

U.S. Cl. X.R.

195—142, 143